(12) United States Patent
Balakrishnan et al.

(10) Patent No.: US 9,671,945 B2
(45) Date of Patent: Jun. 6, 2017

(54) TECHNIQUES OF LAUNCHING VIRTUAL MACHINE FROM THIN CLIENT

(71) Applicant: AMERICAN MEGATRENDS, INC., Norcross, GA (US)

(72) Inventors: Venkatesan Balakrishnan, Chennai (IN); Varadachari Sudan Ayanam, Suwanee, GA (US); Veerajothi Ramasamy, Chennai (IN); Vivekanand Promad Kumar, Bihar (IN); Indira Valmiki, Anantapur (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 587 days.

(21) Appl. No.: 14/108,681

(22) Filed: Dec. 17, 2013

(65) Prior Publication Data
US 2015/0169206 A1 Jun. 18, 2015

(51) Int. Cl.
| | |
|---|---|
| G06F 3/048 | (2013.01) |
| G06F 3/0484 | (2013.01) |
| H04L 12/24 | (2006.01) |
| H04L 29/08 | (2006.01) |
| G06F 9/44 | (2006.01) |
| G06F 21/53 | (2013.01) |

(Continued)

(52) U.S. Cl.
CPC ...... *G06F 3/04847* (2013.01); *G06F 3/04842* (2013.01); *G06F 9/4445* (2013.01); *G06F 21/53* (2013.01); *H04L 41/0273* (2013.01); *H04L 41/0806* (2013.01); *H04L 67/02* (2013.01); *H04L 67/08* (2013.01); *H04L 67/10* (2013.01); *H04L 67/141* (2013.01); *G06F 9/45533* (2013.01); *H04L 63/08* (2013.01)

(58) Field of Classification Search
CPC .... G06F 9/455; G06F 9/4445; G06F 9/45533; G06F 3/04847; H04I 12/24
See application file for complete search history.

(56) References Cited

U.S. PATENT DOCUMENTS

| | | | |
|---|---|---|---|
| 6,758,752 B1 * | 7/2004 | Miyagawa | A63F 13/10 345/213 |
| 2003/0229777 A1 * | 12/2003 | Morais | G06F 21/575 713/2 |

(Continued)

*Primary Examiner* — William Bashore
*Assistant Examiner* — Gregory A DiStefano
(74) *Attorney, Agent, or Firm* — Locke Lord LLP; Tim Tingkang Xia, Esq.

(57) ABSTRACT

Certain aspects direct to a computing device for launching a virtual machine at a hypervisor. In certain embodiments, the computing device is a thin client or a zero client, which stores a user interface (UI), a first virtual desktop client (VDC) and a communication module. The UI receives input from a user of the computing device, and initializes the first VDC locally. The first VDC communicates with a first virtual machine (VM) hosted by a hypervisor of a remote computer system, receives desktop video display signals from the first VM, and sends signals associated with input from a user to the VM hosted by the hypervisor. The communication module constructs a first web-services message in accordance with a first web services protocol, and sends the first web-services message to the hypervisor, wherein the first web-services message instructs the hypervisor to perform a hypervisor management function.

22 Claims, 4 Drawing Sheets

(51) Int. Cl.
 *G06F 9/455* (2006.01)
 *H04L 29/06* (2006.01)

(56) References Cited

U.S. PATENT DOCUMENTS

| | | | | |
|---|---|---|---|---|
| 2007/0171921 | A1* | 7/2007 | Wookey | G06F 3/1415 370/401 |
| 2009/0172661 | A1* | 7/2009 | Zimmer | G06F 9/45558 718/1 |
| 2009/0300403 | A1* | 12/2009 | Little | G06F 11/0709 714/2 |
| 2011/0004680 | A1* | 1/2011 | Ryman | G06F 9/4445 709/224 |
| 2011/0314470 | A1* | 12/2011 | Elyashev | G06F 11/1484 718/1 |
| 2012/0311564 | A1* | 12/2012 | Khalid | G06F 8/61 718/1 |
| 2014/0317617 | A1* | 10/2014 | O'Donnell | G06F 9/45533 718/1 |

* cited by examiner

TECHNIQUES OF LAUNCHING VIRTUAL MACHINE FROM THIN CLIENT

FIELD

The present disclosure generally relates to thin clients or zero clients communicating with virtual machines running on a hypervisor, and more particularly to techniques for launching a virtual machine at a hypervisor from a thin or zero client.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Traditional network-based computer architectures generally involve multiple traditional personal computers, each of which comprises its own computing system components such as a central processing unit, memory, etc., each of which is connected to a centralized server or servers. Management of resources in such architectures, however, has become increasingly complex as the size of networks continues to grow. In addition to the physical logistics of such a network, problems such as asset management, support costs, troubleshooting, etc., all make such an architecture potentially unworkable. Further, in many cases, network users do not need the resources or computing power offered by a personal computer, and therefore these expensive resources are underutilized in such architectures.

To combat the inefficiencies of traditional network-based computer architectures making extensive use of personal computers, many network-based architectures have transitioned to a server-based computing models, such as thin client or zero client. Typically, a zero client or thin client is heavily dependent on another computer system or server, which generally fulfills the computational rolls for the zero client or ultrathin client. In such cases, the zero client is simply a low-end computer terminal, which includes peripherals such as a monitor, keyboard, and mouse, that also provides a graphical user interface (GUI) to the user. In such configurations, a central computer system or server hosts the operating systems and software applications utilized by the thin client or zero client.

Generally, a system user utilizes the thin or zero client's local GUI to provide credentials that allow the user to access a desktop operating system that is hosted within a virtual machine running on the centralized server. Once the user provides the credentials to access the virtualized desktop, those resources are displayed on the user's monitor, and the resources for providing the local GUI are terminated. From time to time, a virtual machine to be accessed by a user may not be launched or running at the hypervisor. The thin client or zero client consequently will fail to establish a communication with the virtualized desktop.

Therefore, an unaddressed need exists in the art to address the aforementioned deficiencies and inadequacies.

SUMMARY

Certain aspects of the present disclosure direct to a computing device, including a processor; a graphic processing unit; a random access memory (RAM); and a non-volatile memory. The non-volatiles memory stores: a user interface (UI) configured to, when executed at the processor, receive input from a user of the computing device, wherein the UI is configured to communicate with a first virtual machine (VM) hosted by a hypervisor of a remote computer system, and wherein the UI is configured to initialize a first virtual desktop client (VDC) locally; the first VDC configured to, when executed at the processor, communicate with the first VM and receive desktop video display signals from the first VM and send signals associated with input from a user to the VM hosted by the hypervisor; and a communication module configured to, when executed at the processor, construct a first web-services message in accordance with a first web services protocol and send the first web-services message to the hypervisor, wherein the first web-services message instructs the hypervisor to perform a hypervisor management function.

In certain embodiments, the computing device is a thin client or zero client.

In certain embodiments, the first web-services message is a Simple Object Access Protocol (SOAP) message and the first web services protocol is in accordance with Web Services for Management (WS-MAN) specifications.

In certain embodiments, the UI is configured to, when the UI fails to communicate with the first virtual machine, instruct the communication module to construct a first web-services message that queries an operating status of the first virtual machine.

In certain embodiments, the UI is configured to allow a user to input an identification and a network address of the hypervisor, wherein the communication module is configured to send the first web-services message to the hypervisor using the identification and the network address.

In certain embodiments, the UI is configured to, when receiving an indication that the first virtual machine is not running, instruct the communication module to construct a second web-services message that instructs the hypervisor to launch the first virtual machine.

In certain embodiments, the UI is configured to allow a user to input credentials of an administrator of the hypervisor and send the credentials to the communication module, wherein the communication module is configured to verify the credentials with a web services management module of the hypervisor through the first web-services protocol.

In certain embodiments, the UI is configured to save the credentials locally on the computing device in an encrypted form.

In certain embodiments, the hypervisor includes a virtual system management server, wherein the web services management module is configured to receive the first web-services message from the communication module of the computing device; extract an indication of the hypervisor management function; and send the indication to the virtual system management server, wherein the virtual system management server is configured to perform the hypervisor management function.

In certain embodiments, the UI is configured to communicate with a second VM hosted by the hypervisor and to initialize a second VDC locally, wherein the second VDC is configured to, when executed at the processor, communicate with the second VM and receive desktop video display signals from the second VM and send signals associated with input from a user to the second VM.

In certain embodiments, the input received from a user of the computing device includes at least one of: user name; password; and selection of a virtual machine.

In certain embodiments, the non-volatile memory further stores a boot program, wherein the processor is configured to load the boot program into the RAM, wherein the boot program is configured to, when executed by the processor, initialize the RAM and the graphic processing unit.

In certain embodiments, the RAM comprises a graphic area for receiving image frame data.

In certain embodiments, the graphic processing unit is configured to retrieve image frame data from a graphic area of the RAM, and process the image frame data and generate video output signals.

Certain aspects of the present disclosure direct to a method of launching a virtual machine (VM) at a remote computer system from a computing device, including: receiving, by a user interface (UI) executed at a processor of the computing device, an input from a user; initializing, by the UI, a first virtual desktop client (VDC) locally; communicating, by the first VDC executed at the processor of the computing device, with a first VM hosted by a hypervisor of a remote computer system; receiving, by the first VDC, desktop video display signals from the first VM; sending, by the first VDC, signals associated with the input from the user to the VM hosted by the hypervisor; constructing, by a communication module executed at the processor of the computing device, a first web-services message in accordance with a first web services protocol; and sending, by the communication module, the first web-services message to the hypervisor, wherein the first web-services message instructs the hypervisor to perform a hypervisor management function.

In certain embodiments, the computing device is a thin client or zero client. In certain embodiments, the first web-services message is a Simple Object Access Protocol (SOAP) message and the first web services protocol is in accordance with Web Services for Management (WS-MAN) specifications. In certain embodiments, the input received from the user of the computing device includes at least one of: user name; password; and selection of a virtual machine.

In certain embodiments, the method further includes: when the UI fails to communicate with the first VM, instructing, by the UI, the communication module to construct a first web-services message that queries an operating status of the first virtual machine; allowing, by the UI, the user to input an identification and a network address of the hypervisor; sending, by the communication module, the first web-services message to the hypervisor using the identification and the network address; and when the UI receives an indication that the first VM is not running, instructing, by the UI, the communication module to construct a second web-services message that instructs the hypervisor to launch the first VM.

In certain embodiments, the method further includes: allowing, by the UI, a user to input credentials of an administrator of the hypervisor and send the credentials to the communication module, wherein the communication module is configured to verify the credentials with a web services management module of the hypervisor through the first web-services protocol; and saving, by the UI, credentials locally on the computing device in an encrypted form.

In certain embodiments, the hypervisor includes a virtual system management server, wherein the web services management module is configured to receive the first web-services message from the communication module of the computing device; extract an indication of the hypervisor management function; and send the indication to the virtual system management server, wherein the virtual system management server is configured to perform the hypervisor management function.

In certain embodiments, the method further includes: initializing, by the UI, a second VDC locally; communicating, by the second VDC executed at the processor of the computing device, with a second VM hosted by the hypervisor; receiving, by the second VDC, desktop video display signals from the second VM; and sending signals associated with the input from the user to the second VM.

Certain aspects of the present disclosure direct to a non-transitory computer readable medium storing computer executable codes, wherein the codes includes: a user interface (UI) configured to, when executed at a processor of a computing device, receive input from a user of the computing device, wherein the UI is configured to communicate with a first virtual machine (VM) hosted by a hypervisor of a remote computer system, and wherein the UI is configured to initialize a first virtual desktop client (VDC) locally; the first VDC configured to, when executed at the processor, communicate with the first VM and receive desktop video display signals from the first VM and send signals associated with input from a user to the VM hosted by the hypervisor; and a communication module configured to, when executed at the processor, construct a first web-services message in accordance with a first web services protocol and send the first web-services message to the hypervisor, wherein the first web-services message instructs the hypervisor to perform a hypervisor management function.

In certain embodiments, the computing device is a thin client or zero client. In certain embodiments, the first web-services message is a Simple Object Access Protocol (SOAP) message and the first web services protocol is in accordance with Web Services for Management (WS-MAN) specifications. In certain embodiments, the input received from the user of the computing device includes at least one of: user name; password; and selection of a virtual machine.

In certain embodiments, the UI is configured to: when the UI fails to communicate with the first VM, instruct the communication module to construct a first web-services message that queries an operating status of the first virtual machine; allow the user to input an identification and a network address of the hypervisor, wherein the communication module is configured to send the first web-services message to the hypervisor using the identification and the network address; when the UI receives an indication that the first VM is not running, instruct the communication module to construct a second web-services message that instructs the hypervisor to launch the first VM; allow a user to input credentials of an administrator of the hypervisor and send the credentials to the communication module, wherein the communication module is configured to verify the credentials with a web services management module of the hypervisor through the first web-services protocol; and save credentials locally on the computing device in an encrypted form.

In certain embodiments, the hypervisor includes a virtual system management server, wherein the web services management module is configured to receive the first web-services message from the communication module of the computing device; extract an indication of the hypervisor management function; and send the indication to the virtual system management server, wherein the virtual system management server is configured to perform the hypervisor management function.

In certain embodiments, the UI is configured to communicate with a second VM hosted by the hypervisor and to initialize a second VDC locally, wherein the second VDC is configured to, when executed at the processor, communicate with the second VM and receive desktop video display signals from the second VM and send signals associated with input from a user to the second VM.

These and other aspects of the present disclosure will become apparent from the following description of the preferred embodiments taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate; meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 1:
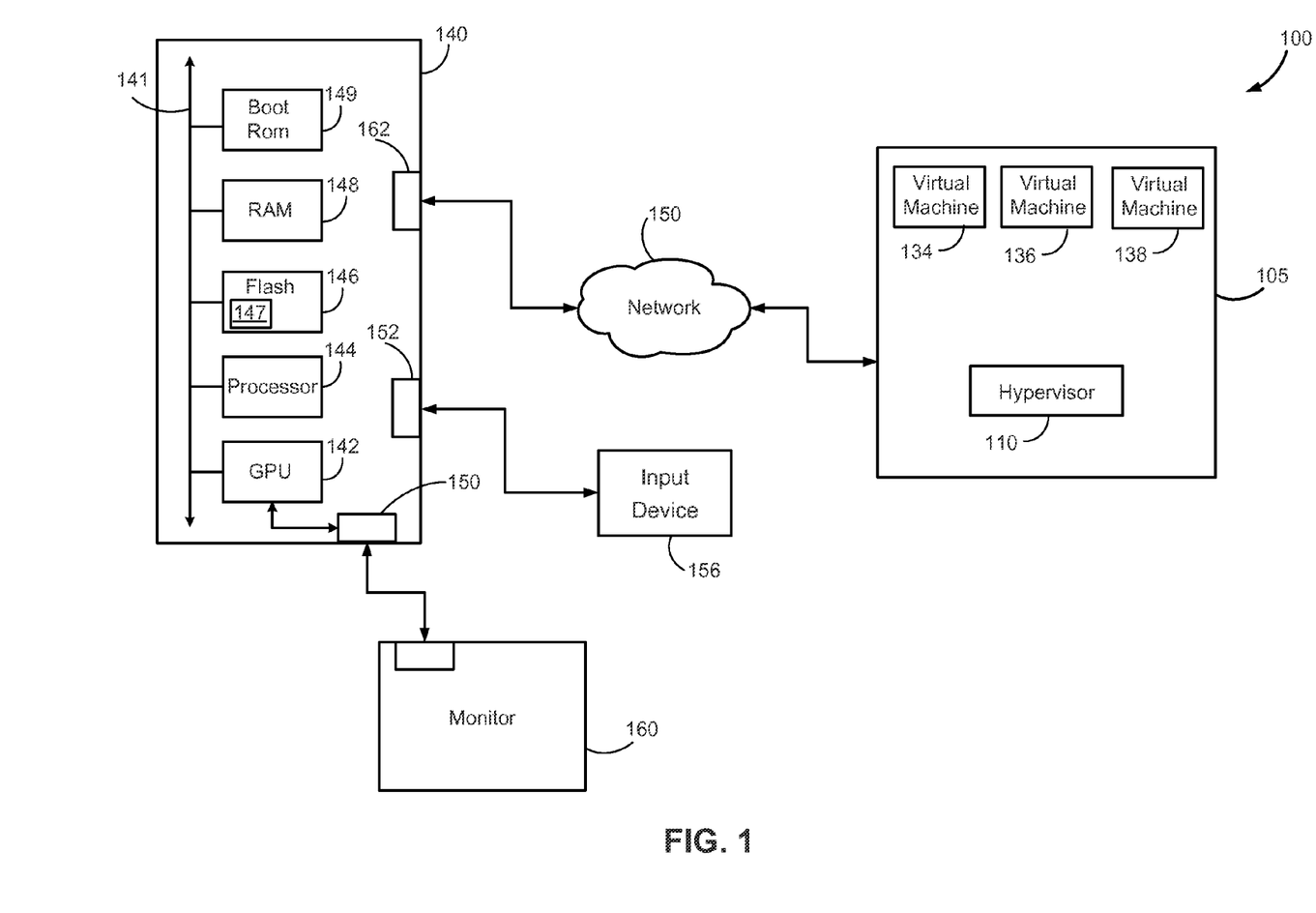
FIG. 1 illustrates an environment in which an embodiment of a thin client or zero client is operatively connected to a computer system hosting multiple virtual machines or unprivileged domains, according to certain embodiments of the present disclosure.

FIG. 1 shows an environment 100 in which an embodiment of a thin client or zero client 140 is operatively connected to a computer system 105 hosting multiple virtual machines or unprivileged domains (e.g., 134, 136, and 138), which are managed by a hypervisor 110, according to certain embodiments of the present disclosure. As shown in the FIG. 1 embodiment, the client 140 is configured to operatively connect to the computer system 105 via a network 170 such as the Internet. In alternate embodiments, the client 140 and computer system 105 may be interconnected via a local area network (LAN) or wide area network (WAN). The connection between the client 140 and the computer system 105 may be configured to display and audio to the client 140 as well as keyboard or mouse input/output to the computer system 105 by means of a single protocol (e.g., the TCP/IP protocol).

As shown, FIG. 1 schematically illustrates a thin client or zero client 140 in accordance with certain embodiments of the present disclosure. As previously noted, a thin client or zero client 140 generally is a computer that relies heavily on some other computer system or server (e.g., 105) to fulfill its computational roles. In certain embodiments, a thin client or zero client 140 comprises a local operating system, though this local operating system typically provides basic functionalities such as a local graphical interface. For example, in one embodiment, the local operating system may be a kernel such as the LINUX kernel. In certain embodiments, the thin client or zero client comprises a system on a chip (processor) 144, graphic processing unit 142, a non-volatile memory (such as a flash memory) 146, and a random access memory (RAM) 148, which are in communication with each other through a system bus 141. Further, as shown in the FIG. 1 embodiment, the thin client 140 comprises a boot rom 149. The client 140 may comprise additional physical or virtual components not shown in the FIG. 1 embodiment. Further, though the FIG. 1 environment 100 shows only a single thin client 140, it is common for multiple thin clients or zero clients to exist as components of a broader computer infrastructure wherein each of the clients share resources from the same server or computer system 105.

In one embodiment, a thin client 140 is a computer terminal or other housing connected to a monitor or computer display 160 that provides a graphical user interface (alternatively, GUI, local GUI, UI) to a user, as will be discussed further. In the FIG. 1 embodiment, the client 140 does not include a conventional operating system as it receives such resources from the computer system 105 (as will be discussed). The client 140 may, however, comprise an operating system in various other embodiments.

The processor 144 can be any suitable processor that may contain digital, analog, mixed-signal, and radio-frequency functions. Generally, the processor 144 comprises various hardware components (e.g., processor core, timing sources, external interfaces, analog interfaces, voltage regulators, etc.) as well as related software. Further, in certain embodiments, the processor 144 can be configured to read and execute code from a preset location of the flash memory 146. For example, a loader program, which can load additional code, can be placed at a preset location.

In certain embodiments, the boot rom 149 contains the initial code that the processor 144 executes after a power-on reset. For example, the initial code can include necessary code and configurations to initialize the flash memory 146. Subsequently, the initial code can instruct the processor 144 to load a boot program from a predetermined location in the flash memory 146. In certain embodiments, the boot rom 149 can be a small piece of mask ROM or write-protected flash embedded inside the processor 144, an EPROM chip, etc.

As shown in the FIG. 1 embodiment, the client 140 comprises various memory elements such as a flash memory device 146 and a random-access memory (RAM) device 148, which are configured in accordance with certain embodiments of the present disclosure. In one embodiment, the memory devices (e.g., 146 and 148) are not user-modifiable and are simply involved in the operation of the client 140. In other embodiments, the memory devices (e.g., 146 and 148) may be user-modifiable and may be used to store data and information relating to the operation of the client 140.

Generally, the flash memory 146 stores information in an array of memory cells made from floating-gate transistors. Such a configuration is different in nature from other volatile or non-volatile memory because the information or data stored therein must be erased before new data can be written into the memory cells. In general, there are two common types of flash memory: NAND-type (named after NAND logic gates) and NOR-type (named after NOR logic gates). In a NAND-type flash memory, data may be written and read in "blocks" or "pages," which are the basic accessible memory units. The NOR-type flash memory allows a single machine word (i.e., byte) to be written or read independently. In either flash memory type, however, the erasing process is limited to erasing one block at a time. In other words, the flash memory 146 does not offer random-access erasing or rewriting operations. In other embodiments the flash memory 146 may be provided as a serial peripheral interface (SPI) flash memory.

In one embodiment, the flash memory 146 stores a boot program 147 that includes code and configurations that, when executed by the processor 144, can test and initialize some or all of the components of the thin client or zero client 140. Further, the boot program 147 may include code and configurations that, when executed by the processor 144 can initialize a local graphical user interface 315 and a monitoring application 310, as will be described below.

In one embodiment, the RAM device 148 has a boot memory space that is utilized by a boot program, a general area, and a graphic area, as will be discussed in connection with FIG. 3.

As further shown in the FIG. 1 embodiment, the client 140 comprises a graphic processing unit 142 (i.e., video adapter, graphics card, display card, etc.). In general, the graphic processing unit 142 converts binary data into images displayed on the monitor 160. In one embodiment, the graphic processing unit 142 comprises a processor (i.e., graphics processing unit or GPU) and a small amount of embedded memory but also utilizes the RAM 148 of the client 140. According to one embodiment, in such a configuration (i.e., shared graphics memory), a mechanism exists (e.g., via the BIOS or a jumper setting) to select the amount of system memory that will be dedicated to displaying graphics. As will be discussed further in connection with FIGS. 3-4, in certain embodiments, the graphic processing unit 142 can access the graphic area in the RAM device 148.

In one embodiment, the client also comprises a connection system between the graphic processing unit 142 and the monitor or computer display 160. In one embodiment, the connection system is a video graphics array (VGA, VGA connector), which is an analog-based standard interface. Alternatively, in one embodiment, the connection system is a digital visual interface (DVI), with is the digital-based standard design for most flat-panel displays. In other embodiments, the connection system may be a high-definition multimedia interface (HDMI) or other connection means familiar to one of ordinary skill in the art. As will be discussed, in one embodiment, the graphic processing unit is configured to transmit both a local GUI and/or the user interface of a virtual machine or operating system to the monitor 160, as will be discussed.

Additionally, as shown in the FIG. 1 embodiment, the client 140 comprises an interface 152, which is a physical input/output hardware device such as a USB port. In one embodiment, the interface 152 allows a user to connect various peripherals to the client 140 such as human interface devices 156 including a keyboard or mouse (or any other human interface devices), with which the user can interact with the local GUI and/or the user interface of a virtual machine. Alternatively, in other embodiments any other serial bus protocol aside from USB may be used as desired.

In certain embodiments, the thin client 140 has a network communication interface 162. Through the network communication interface 162, the thin client 140 is in communication with the hypervisor 110 and the virtual machine 134, 136, 138 through the network 170. For example, as will be described in detail below, the virtual machine 134, 136, 138 can send image frame signals to the thin client 140 through the network communication interface 162. The thin client 140 can send input control commands or data to the virtual machine 134, 136, 138 or the hypervisor 110 through the network communication interface 162.

Figure 2:
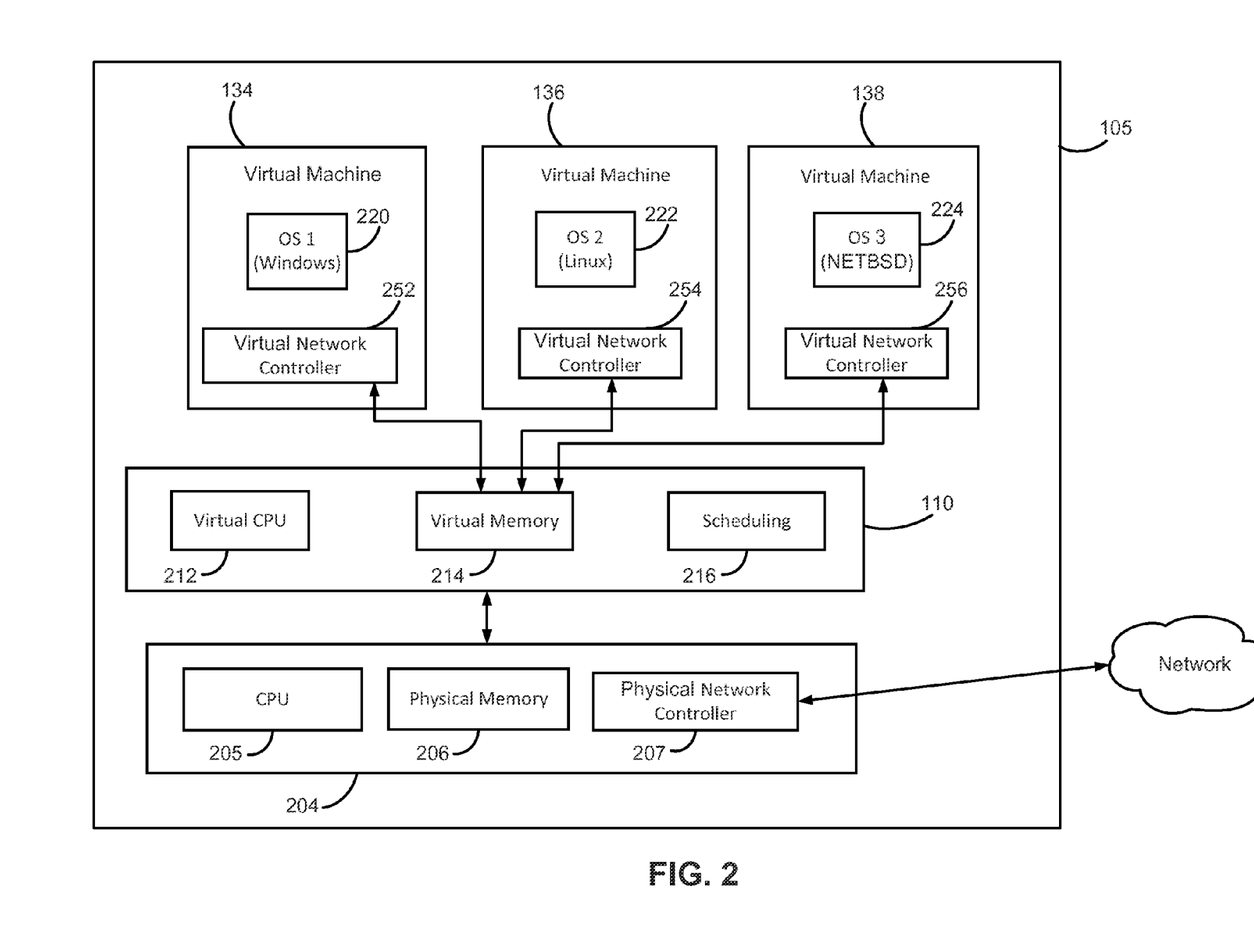
FIG. 2 schematically illustrates a computer system in which a hypervisor hosts multiple virtual machines or unprivileged domains in accordance with certain embodiments of the present disclosure.

FIG. 2 illustrates a more detailed view of computer system 105 in which a hypervisor 110 hosts multiple virtual machines (i.e., unprivileged domains) 134, 136, 138 in accordance with certain embodiments of the present disclosure. Virtualization allows a number of virtual servers (such as an operating system 220, 222, 224) to be consolidated into a single physical machine 204, without losing the security gained by having completely isolated environments. Virtualization makes it relatively easy to migrate virtual machines from one physical computer to another, thus making it easy to maintain redundant virtual server images synchronized across physical machines. A virtual machine gets certain features, such as cloning, at a very low cost. A virtual machine can be migrated to another host if the hardware begins to experience faults or if an upgrade is scheduled. The virtual machine can then be migrated back to the original machine when the original machine is working again. Further, a virtual machine can be accessed by a thin client or zero client 140 that is able to utilize the resources offered by the virtual machine without allocating the client's 140 local resources to hosting an operating system locally.

In certain embodiments, a hypervisor 110 is running on the computer system 105. Stated in a simplified way, the hypervisor 110 runs on top of the hardware including the CPU 205 and the physical memory 207. In certain embodiments, the hypervisor 110 can be stored or pre-built in a flash ROM of the computer system 105. Alternatively, the hypervisor can be stored or pre-built in the hard drive of the computer system 105. The hypervisor has, among other thing, virtual CPUs 212, virtual memories 214, and scheduling services 216. Further, in one embodiment, the hypervisor 110 hosts virtual machines or domains 134, 136, 138, which encapsulate a complete running virtual environment. According to one embodiment, a thin client or zero client 140 can access one of the virtual machines (e.g., 134, 136, 138) and interface with the graphical interface of the virtual machine at the monitor 160 connected to the client 140. According to certain embodiments, the connectivity between the virtual machine (e.g., 134) and the monitor 160 of the client 140 is provided via a virtual desktop client (VDC) using a standard or proprietary protocol such as a Remote Desktop Protocol (RDP) client, a Virtual Network Computing (VNC) client or an Advanced Adaptive Video Compression Algorithm (AAVICA) client, as will be discussed in relation to FIG. 4. Further, in one embodiment, each VDC or an RDP client is in communication with one of the operating systems running on the virtual machines hosted by the hypervisor 110, and the VDC or RDP client transmits user input signals to the operating system through one or more virtual desktop protocols supported by the operating system, while operating system in turn transmits or redirects video display signals or video display data to the VDC or RDP client. In alternate embodiments, the VDC or RDP client may be in communication with the hypervisor 110 or a server-side client that is in communication with the hypervisor 110.

One skilled in the art would appreciate that the hypervisor 110 can also run on two CPUs, four CPUs, eight CPUs, or any suitable number of CPUs. The hypervisor 110 can be of various types and designs, such as CITRIX, XEN, MICROSOFT HYPER-V, VMWARE ESX or AAVICA. The hypervisor 110 can emulate one or more virtual machines or domains 134, 136, 138. An operating system 220, 222, 224 can be installed in a virtual machine 134, 136, 138. The operating system 220, 222, 224 may not realize that it is running on virtual machine and may perceive that it is running on a physical machine. The operating systems 220, 222, 224 running on the virtual machine 134, 136, 138 can host one or more application programs.

In certain embodiments, the hypervisor 110 hosts one or more virtual machines (unprivileged domains) 134, 136, 138. According to one embodiment, each of the virtual machines 134, 136, 138 can run an operating system or other guest. For example, the first virtual machine 134, the second virtual machine 136, and the third virtual machine 138 can run WINDOWS, LINUX, and NETBSD operating systems (or various other operating systems), respectively, any of which may be accessed by a thin client or zero client 140. In one embodiment, the operating system (e.g., 220) can be collective management software for managing the operation of various resources or processes that may be utilized by the client 140. For example, the operating system (e.g., 220) can include a set of functional programs that control and manage operations of devices that may be connected to the client 140. Generally, the set of application programs provide certain utility software for the user to manage the client 140 or various other computing processes. In certain embodiments, the operating system is operable to multitask, i.e., execute computing tasks in multiple threads.

Further, in one embodiment, a virtual machine 134, 136, 138 can provide a virtual network controller 252, 254, 256. From the perspective of an operating system or other guest run in the virtual machine 134, 136, 138, the virtual network controller 252, 254, 256 appears as a physical network controller. The operating system 220, 222, 224 can utilize the virtual network controller 252, 254, 256 to access the network. For example, the operating system 220 in the virtual machine 134 can have a network interface for communicating with the virtual network controller 252. To support the operating system 220 run in the virtual machine 134 in accessing an Ethernet network and/or IP network, the virtual network controller 252 can be assigned a MAC address 264 and/or IP address 266, which can be utilized in interfacing with the thin client or zero client 140.

Figure 3:
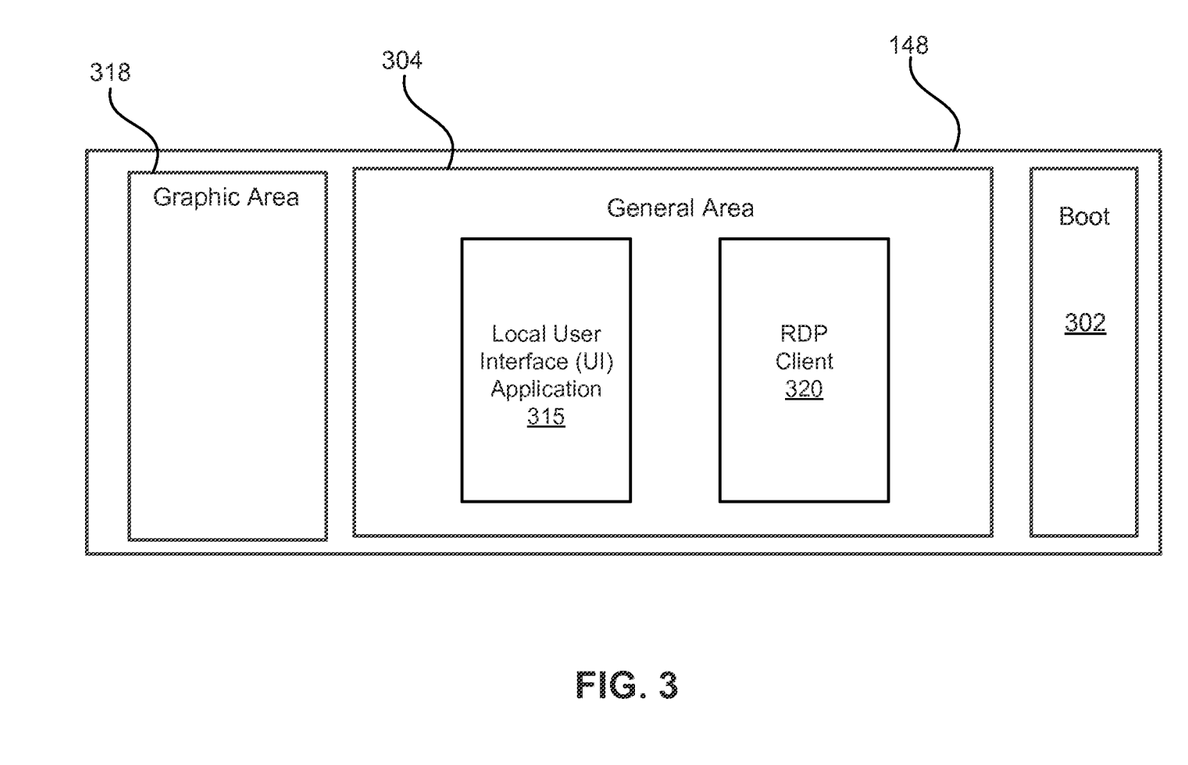
FIG. 3 schematically illustrates a RAM device configured in accordance with certain embodiments of the present disclosure.

FIG. 3 illustrates memory allocation of the RAM device 148 in accordance with certain embodiments of the present disclosure. In certain embodiments, the thin client 140 has a UI 315 stored in the flash memory 146. When the thin client 140 is initially boot up, the processor 144 can load the UI 315 into the RAM device 148. The RAM device 148 can be any suitable type, such as DDR3. Typically, the RAM device 148 has a boot memory area 302 that is utilized by a boot program as well as other memory (i.e., general area 304) that is accessible to and utilized by various other devices on the thin client 140 (e.g., processor 144, graphic processing unit 144, etc.).

The processor 144 loads the UI 315 into the general area 304 of the RAM 148. In one embodiment, the UI 315 allows a user to interact with the client 140 and provide various user credentials (e.g., user name, password, etc.), which may be used to select and boot up a VM (e.g., 134) for use on the client 140. In one embodiment, the UI 315 receives user input via a peripheral device such as a keyboard or mouse. In certain embodiments, a boot program 147 initializes the UI 315 in a process and loads the UI 315 to the memory area 304 for execution. The processor executes the UI application 315 embodiments, the web services management server 420 can utilize specifications other than of the RAM device 148. The graphic area 318 is also accessible by the graphic processing unit 142, which subsequently processes the image frame data and generates video output signals accordingly. The video output signals are transmitted from a video output 150 of the thin client 140 to a video input of the monitor 160.

Figure 4:
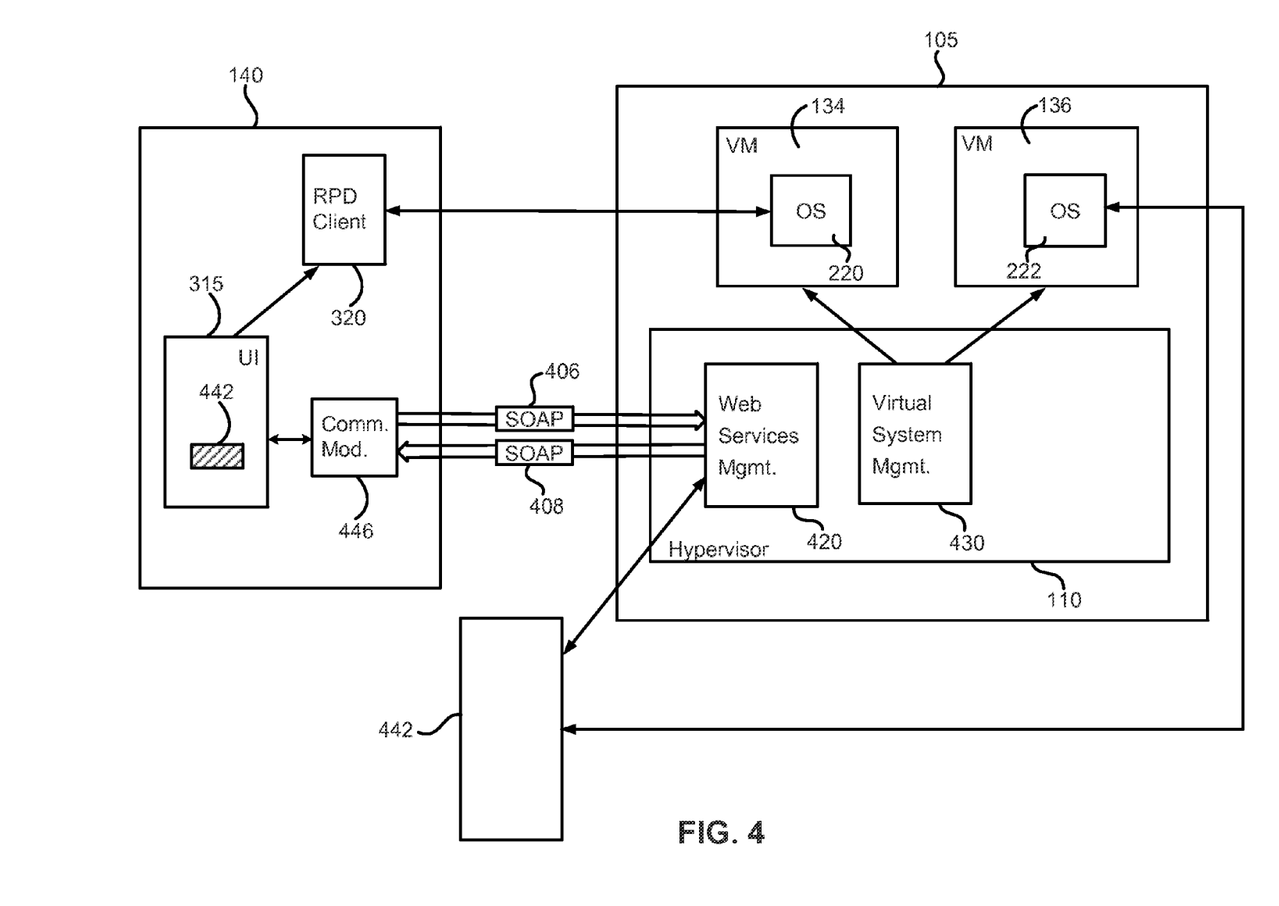
FIG. 4 schematically illustrates a thin client in communication with a hypervisor in accordance with certain embodiments of the present disclosure.

FIG. 4 schematically illustrates a thin client in communication with a hypervisor in accordance with certain alternate embodiments of the present disclosure. As previously noted, a user may utilize the UI 315 of the thin client 140 to provide credentials of a particular virtual machine 134 (e.g., user name, password, etc.), which allow the user to select that particular virtual machine 134 to access via the thin client 140 during a particular session, i.e., the duration in which the user is engaging the particular virtual machine 134.

Typically, when a user initiates a session with a particular virtual machine 134, a graphical interface for interfacing with the virtual machine 134 is provided from the computer system 105 to the client 140 via a network connection. For example, the graphical interface for interfacing the virtual machine 134 can be provided to a virtual desktop client (VDC) 320 via various communication protocols such as the Remote Desktop Protocol (RDP). The VDC 320 such as an RDP client is a client application allowing a user to access and control resources at a remote computer (e.g., computer system 105). Alternatively, the graphical interface for interfacing the virtual machine 134 may be provided as part of a virtual desktop infrastructure (VDI) via a commercial product such as XENDESKTOP as provided by CITRIX or HORIZON VIEW as provided by VMWARE, according to one embodiment.

For simplicity and brevity, in the below description, the present disclosure may only use RDP and its associated applications as examples. One skilled in the art, however, would appreciate other remote communication protocols such as those mentioned above including VDI, XENDESKTOP, HORIZON VIEW can be similarly adapted in certain embodiments of the present disclosure.

As discussed above, the hypervisor 110 runs one or more virtual machines 134, 136, 138, which each in turn can run an operating system. Each operating system can run one or more remote desktop server (not shown) such as an RDP server, a VDI server or an AAVICA server.

Further, as shown in FIG. 4, a user can utilize a user interface (not shown) at a second thin client 442 to communicate with another virtual machine 136 running on the hypervisor 110 and the initiate a virtual desktop client providing a graphical interface (e.g., remote desktop application) interacting with the virtual machine 136.

After a user selects a particular virtual machine (which is defined to include the operating system run in the virtual machine) through the UI 315, the UI 315 can launch a RDP client 320 that can communicate with the remote desktop server (not shown) of the selected virtual machine 134, 136, 138. As shown in the FIG. 3 embodiment, the processor 144 loads the RDP client software 320 into RAM device 148. In one embodiment, when the processor 144 executes the RDP client software 320 to communicate with the remote desktop server (not shown), the remote desktop server responds by providing display data of the virtual machine 134. In one embodiment, the remote desktop server receives the display data from the OS 220 run on the virtual machine 134 and send the display data to the RDP client 320. According to one embodiment, the RDP client 320 routes the display data to the graphic area 318 of the RAM device 148 where it can be accessed and processed by the graphic processing unit 142 such that it can be displayed on the monitor 160.

In circumstances, a virtual machine 134, 136, 138 selected by the user for some reasons may not be running on the hypervisor 110. For example, it is possible that the hypervisor 110 has not launched the selected virtual machine 134, 136, 138. Therefore, the UI 315 cannot communicate with the selected virtual machine 134, 136, 138 and cannot launch a RDP client 320 communicating with the remote desktop server (not shown) of the selected virtual machine 134, 136, 138 (since it is not running) The UI 315 can display an error message, informing the user of failure to establish a communication.

In certain embodiments, the UI 315 can query the hypervisor 110 regarding the status of the selected virtual machine 134, 136, 138. For example, the UI 315 can utilize the communication module 446 to send a web-services message in accordance with a particular web services protocol to the hypervisor 110. The web-services message can instruct the hypervisor 110 to perform a hypervisor management function. In certain embodiments, as will be described below, the hypervisor 110 provides services as defined by Web Services for Management (WS-Management or WS-MAN) Specification version 1.0.0 provided by DMTF, which is incorporated herein by reference. Particularly, the hypervisor 110 can receive and process Simple Object Access Protocol (SOAP) messages constructed in accordance with WS-MAN. SOAP specifications (e.g. version 1.1 and 1.2) are defined by the World Wide Web Consortium (W3C) and are incorporated herein by reference.

In certain embodiments, the UI 315 can utilize the communication module 446 to communicate with the hypervisor 110 using SOAP messages 406s. As will be described below, the communication module 446 can construct a SOAP message 406 and send the SOAP messages 406 to the hypervisor 110 as instructed by the UI 315.

In certain embodiments, the UI 315 may not know which hypervisor runs the particular virtual machine 134, 136, 138 and may not have credentials of an administrator of the hypervisor 110. The UI 315 can display input fields to the user and ask the user to input necessary information to identify the hypervisor 110 and to access and manage the hypervisor 110. For example, the UI 315 can display input fields for inputting the IP address of the hypervisor 110, the host name of the hypervisor 110, an administrator's user name, and the administrator's password. Once the UI 315 receives the identity information of the hypervisor 110 and the administrators credentials, the UI 315 can instruct the communication module 446 to construct a corresponding SOAP messages 406, for example in accordance with WS-MAN, and then transmit the SOAP messages 406 to the hypervisor 110 through any suitable transport protocol such as TCP, HTTP, SMTP, or even MSMQ.

In certain embodiments, when the information of the hypervisor 110 is not available for communication, a user may enter the information through the UI 315. Alternatively, the thin client 140 may discover and populate the information of the hypervisor 110 using proprietary protocols or universal plug and play (UPnP) connections.

In certain embodiments, after the first time a user input the administrator's credentials of the hypervisor 110, the UI 315 can save the credentials as an encrypted copy 442 on the thin client 140 locally. Therefore, when the next time the UI 315 needs the administrator's credentials to access and manage the hypervisor 110, the UI 315 can obtain the credentials locally without asking the user to input them again.

In certain embodiments, the UI 315 can send the hostname and IP address of the hypervisor 110 to the communication module 446 and instruct the communication module 446 to construct a SOAP message 406 querying the status of the virtual machine 134, 136, 138 for which the UI 315 failed to launch a RDP client 320. As will be described below, the communication module 446 can construct the SOAP messages 406 and send the SOAP messages 406 to the hypervisor 110. The communication module 446 receives a response SOAP message 408 from the hypervisor 110 indicating the status of the interested virtual machine 134, 136, 138. The communication module 446 can extract the status information from the response SOAP message 408 and then send the status information to the UI 315.

In certain embodiments, the UI 315 can ask a user to provide administrator's credentials of the hypervisor 110 and to input a selection of a hypervisor management function. The management function can be, for example, turning on or shutting off a virtual machine. The UI 315 then sends that information to the communication module 446 and instructs the communication module 446 to construct corresponding SOAP messages 406.

The UI 315 receives the status information from the communication module 446. The status information may indicate that the interested virtual machine 134, 136, 138 is not running on the hypervisor 110. In response to that, the UI 315 can then instruct the communication module 446 to construct a SOAP message 406 instructing the hypervisor 110 to launch the interested virtual machine. In particular, the UI 315 can further send the identity, such as name, of the interested virtual machine 134, 136, 138 to the communication module 446. As will be described below, once receiving these instructions from the UI 315, the communication module 446 can construct a corresponding SOAP message 406 instructing the hypervisor 110 to launch the interested virtual machine 134, 136, 138, and send the SOAP messages 406 to the hypervisor 110. In response to the SOAP messages 406, the hypervisor 110 can launch the interested virtual machine 134, 136, 138 and load the operating system installed on the virtual machine. Subsequently, the remote desktop server (not shown) of the interested virtual machine 134, 136, 138 will be up and running The hypervisor 110 further can send a response SOAP messages 408 indicating that the interested virtual machine is running to the communication module 446 of the thin client 140. The communication module 446 receives the response SOAP messages 408 and extracts the status information from the SOAP messages 408. Then the communication module 446 can then send the status information to the UI 315.

The UI 315 receives the status information, indicating that the interested virtual machine 134, 136, 138 now is running, from the communication module 446. Learning that the interested virtual machine 134, 136, 138 is now running, the UI 315 can then launch the RDP client 320 for communicating with the remote desktop server (not shown) of the interested virtual machine 134, 136, 138.

The communication module 446 of the thin client 140 can construct SOAP messages 406 that are understandable by the hypervisor 110. For example, in certain embodiments, the hypervisor 110 is in compliance with the WS-MAN specifications, and the communication module 446 can construct SOAP messages 406 in accordance with the WS-MAN specifications. Particularly, the communication module 446 can construct SOAP messages 406 that include parameters for managing the hypervisor 110. In certain embodiments, the hypervisor 110 may provide a communication service that is not in accordance with the WS-MAN specifications, but instead in accordance with other web services specifications. Further, hypervisor 110 may have its own customized or proprietary specification and protocol. In these instances, the communication module 446 can communicate with the hypervisor 110 in accordance with the other web services specifications or the customized or proprietary specification and protocol. For example, the communication module 446 can construct SOAP messages 406 accordingly.

SOAP provides a simple, extensible, and rich XML messaging framework for defining higher-level application protocols offering increased interoperability in distributed, heterogeneous environments.

In certain embodiments, the communication module 446 can receive instructions from the UI 315 to query the operation status of a particular virtual machine 134, 136, 138 on a particular hypervisor 110. For example, the communication module 446 can receive administrator's credentials, the IP address and the host name of the hypervisor 110, as well as the name or other identification of the particular virtual machine 134, 136, 138. The communication module 446 can construct a SOAP message 406 including that information to query the operation status of the particular virtual machine 134, 136, 138.

The communication module 446 can send the SOAP messages 406 to the hypervisor identified by the hostname and IP address through various transport protocols such as TCP, HTTP, SMTP, or even MSMQ.

After receiving the administrator's credentials as well as indications of the management functions, the hypervisor 110 can verify the credentials and then perform the management functions accordingly.

In certain embodiments, the communication module 446 receives from the UI 315 identity of a hypervisor 110, administrator's credentials, and indications of management functions to be performed at the hypervisor 110. For example, the communication module 446 can receive instructions to turn on or launch a particular virtual machine on the hypervisor 110. The communication module 446 can construct a SOAP message 406 including that information, for example as an exemplary message shown below, to instruct the hypervisor 110 to launch the virtual machine 134, 136, 138.

```
<s:Envelope xmlns:s="http://www.w3.org/2003/05/soap-envelope"
xmlns:a="http://schemas.xmlsoap.org/ws/2004/08/addressing"
xmlns:w="http://schemas.dmtf.org/wbem/wsman/1/wsman.xsd"
xmlns:p="http://schemas.microsoft.com/wbem/wsman/1/wsman.xsd">
    <s:Header>
        <a:To>http://{IP Address}:5985/wsman</a:To>
        <w:ResourceURI
```

```
   s:mustUnderstand="true">http://schemas.microsoft.com/wbem/
   wsman/1/wmi/root/virtualization/
   Msvm_ComputerSystem</w:ResourceURI>
   <a:ReplyTo>
      <a:Address
      s:mustUnderstand="true">http://schemas.xmlsoap.org/ws/2004/
      08/addressing/role/anonymous</a:Address>
   </a:ReplyTo>
   <a:Action
   s:mustUnderstand="true">http://schemas.microsoft.com/wbem/
   wsman/1/wmi/root/virtualization/Msvm_ComputerSystem/
   RequestStateCha
   <w:MaxEnvelopeSize
   s:mustUnderstand="true">512000</w:MaxEnvelopeSize>
   <a:MessageID>uuid:EC52E79B-A9AB-441F-A002-
   81EA295F905E</a:MessageID>
   <w:Locale xml:lang="en-US" s:mustUnderstand="false" />
   <p:DataLocale xml:lang="en-US" s:mustUnderstand="false" />
   <w:SelectorSet>
      <w:Selector Name="Name">{Name property value of the
      Instance}</w:Selector>
      <w:Selector
      Name="CreationClassName">Msvm_ComputerSystem
      </w:Selector>
   </w:SelectorSet>
   <w:OperationTimeout>PT60.000S</w:OperationTimeout>
</s:Header>
<s:Body>
   <p:RequestStateChange_INPUT
   xmlns:p="http://schemas.microsoft.com/wbem/wsman/1/wmi/root/
   virtualization/Msvm_ComputerSystem">
      <p:RequestedState>2</p:RequestedState>
   </p:RequestStateChange_INPUT>
</s:Body>
</s:Envelope>
```

In certain embodiments, the communication module 446 receives from the UI 315 identity of a hypervisor 110, administrator's credentials, and indications of management functions to be performed at the hypervisor 110. For example, the communication module 446 can receive instructions to turn off a particular virtual machine on the hypervisor 110. The communication module 446 can construct a SOAP message 406 including that information, for example as an exemplary message shown below, to instruct the hypervisor 110 to turn off the virtual machine 134, 136, 138.

```
<s:Envelope xmlns:s="http://www.w3.org/2003/05/soap-envelope"
xmlns:a="http://schemas.xmlsoap.org/ws/2004/08/addressing"
xmlns:w="http://schemas.dmtf.org/wbem/wsman/1/wsman.xsd"
xmlns:p="http://schemas.microsoft.com/wbem/wsman/1/wsman.xsd">
   <s:Header>
      <a:To>http:// {IP Address}:5985/wsman</a:To>
      <w:ResourceURI
      s:mustUnderstand="true">http://schemas.microsoft.com/wbem/
      wsman/1/wmi/root/virtualization/Msvm_ComputerSystem</
      w:ResourceURI>
      <a:ReplyTo>
         <a:Address
         s:mustUnderstand="true">http://schemas.xmlsoap.org/ws/2004/
         08/addressing/role/anonymous</a:Address>
      </a:ReplyTo>
      <a:Action
      s:mustUnderstand="true">http://schemas.microsoft.com/wbem/
      wsman/1/wmi/root/virtualization/Msvm_ComputerSystem/
      RequestStateCha
      <w:MaxEnvelopeSize
      s:mustUnderstand="true">512000</w:MaxEnvelopeSize>
      <a:MessageID>uuid:EC52E79B-A9AB-441F-A002-
      81EA295F905E</a:MessageID>
      <w:Locale xml:lang="en-US" s:mustUnderstand="false" />
      <p:DataLocale xml:lang="en-US" s:mustUnderstand="false" />
      <w:Selector Set>
         <w:Selector Name="Name">{Name property value of the
         Instance}</w:Selector>
         <w:Selector
         Name="CreationClassName">Msvm_ComputerSystem
         </w:Selector>
      </w:SelectorSet>
      <w:OperationTimeout>PT60.000S</w:OperationTimeout>
   </s:Header>
   <s:Body>
      <p:RequestStateChange_INPUT
      xmlns:p="http://schemas.microsoft.com/wbem/wsman/1/wmi/root/
      virtualization/Msvm_ComputerSystem">
         <p:RequestedState>3</p:RequestedState>
      </p:RequestStateChange_INPUT>
   </s:Body>
</s:Envelope>
```

In certain embodiments, the hypervisor 110 includes a web services management server 420. The web services management server 420 can provide services as defined by Web Services for Management (WS-Management or WS-MAN) Specification version 1.0.0 provided by DMTF, which is incorporated herein by reference. Particularly, the web services management server 420 can receive and process SOAP messages 406 constructed in accordance with the WS-MAN specifications.

In certain embodiments, the web services management server 420 can utilize specifications other than the WS-MAN specifications, including customized for proprietary specification and the protocol. In these instances, the web services management server 420 can receive and process SOAP messages 406 constructed in accordance with those specifications.

The web services management server 420 receives SOAP messages 406 from the communication module 446. In accordance with the specification (e.g., the WS-MAN specifications) or protocol used to construct the SOAP messages 406, the web services management server 420 can extract useful information from the SOAP messages 406. For example, the web services management server 420 can extract user credentials information as well as indications of hypervisor management functions to be performed. Then, the web services management server 420 can forward the extracted information to the virtual system management server 430.

Further, the web services management server 420 can receive web-services messages from a communication module of the second thin client 442.

In certain embodiments, the web services management server 420, after receiving a SOAP message 406 from the thin client 140, can opt to send an acknowledge SOAP messages 406 back to the thin client 140.

Further, the web services management server 420 can receive responses from a virtual system management server 430 regarding the user credentials and the requested management functions. For example, the web services management server 420 can receive responses such as that the user credentials cannot be verified, a particular virtual machines operating status, and whether a requested particular virtual machine has been launched or shut down. After receiving those responses, a web services management server 420 can construct corresponding response SOAP messages 408 and sends those messages to the thin client 140.

In certain embodiments, the hypervisor 110 can include a virtual system management server 430 that performs management functions of the hypervisor 110. For example, the virtual system management server 430 can determine operating status of one or more virtual machines of the hypervisor 110. The virtual system management server 430 can launch or shut off one or more of the virtual machines. Typically before performing a requested management function, the virtual system management server 430 verifies the requester's credentials. The virtual system management server 430 also provides a communication interface or application programming interface that can be utilized by other services (e.g., the web services management server 420) to request execution of certain management functions.

The virtual system management server 430 receives user credentials and indications of requested management functions and necessary parameters for executing the functions from the web services management server 420. For example, the virtual system management server 430 can receive administrator's credentials, name or other identification of a particular virtual machine, and an indication of a query-operating-status function. Upon receiving that information, the virtual system management server 430 verifies the credentials received (e.g., user name and password). After it verifies the credentials, the virtual system management server 430 communicates with other components of the hypervisor to determine or obtain the operating status of the particular virtual machine. Once the status is determined, the virtual system management server 430 sends back the status to the requester (i.e., the web services management server 420). For example, the virtual system management server 430 can send a message indicating that the particular virtual machine is not running.

In other circumstances, the virtual system management server 430 can receive a request from the web services management server 420 to launch or shut off a particular virtual machine. Similarly, the virtual system management server 430 can perform those functions and send a result back to the requester (i.e., the web services management server 420). The result can indicate whether the requested function is successfully performed, i.e. whether a particular virtual machine is launched or shut off in accordance with the request.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A computing device comprising:
a processor;
a graphic processing unit;
a random access memory (RAM); and
a non-volatile memory storing
a user interface (UI) configured to, when executed at the processor, receive input from a user of the computing device, wherein the UI is configured to communicate with a first virtual machine (VM) hosted by a hypervisor of a remote computer system, and wherein the UI is configured to initialize a first virtual desktop client (VDC) locally;
the first VDC configured to, when executed at the processor, communicate with the first VM and receive desktop video display signals from the first VM and send signals associated with input from a user to the VM hosted by the hypervisor; and
a communication module configured to, when executed at the processor, construct a first web-services message in accordance with a first web services protocol and send the first web-services message to the hypervisor, wherein the first web-services message instructs the hypervisor to perform a hypervisor management function,
wherein the UI is configured to, when the UI fails to communicate with the first virtual machine, instruct the communication module to construct a first web-services message that queries an operating status of the first virtual machine; and
wherein the UI is configured to, when receiving an indication that the first virtual machine is not running, instruct the communication module to construct a second web-services message that instructs the hypervisor to launch the first virtual machine.

2. The computing device of claim 1, wherein the computing device is a thin client or zero client.

3. The computing device of claim 1, wherein the first web-services message is aSimple Object Access Protocol (SOAP) message and the first web services protocol is inaccordance with Web Services for Management (WS-MAN) specifications.

4. The computing device of claim 1, wherein the UI is configured to allow a user to input an identification and a network address of the hypervisor, wherein the communication module is configured to send the first web-services message to the hypervisor using the identification and the network address.

5. The computing device of claim 1, wherein the UI is configured to allow a userto input credentials of an administrator of the hypervisor and send the credentials to the communication module, wherein the communication module is configured to verify the credentials with a web services management module of the hypervisor through the first web-services protocol.

6. The computing device of claim 5, wherein the UI is configured to save the credentials locally on the computing device in an encrypted form.

7. The computing device of claim 5, wherein the hypervisor comprises a virtual system management server,
wherein the web services management module is configured to receive the first web-services message from the communication module of the computing device;
extract an indication of the hypervisor management function; and
send the indication to the virtual system management server,
wherein the virtual system management server is configured to perform the hypervisor management function.

8. The computing device of claim 1, wherein the UI is configured to communicate with a second VM hosted by the hypervisor and to initialize a second VDC locally, wherein the second VDC is configured to, when executed at the processor, communicate with the second VM and receive desktop video display signals from the second VM and send signals associated with input from a user to the second VM.

9. The computing device of claim 1, wherein the input received from a user of the computing device includes at least one of: user name; password; and selection of a virtual machine.

10. The computing device of claim 1, wherein the non-volatile memory further stores a boot program, wherein the processor is configured to load the boot program intothe RAM, wherein the boot program is configured to, when executed by the processor, initialize the RAM and the graphic processing unit.

11. The computing device of claim 1, wherein the RAM comprises a graphic area for receiving image frame data.

12. The computing device of claim 11, wherein the graphic processing unit isconfigured toretrieve image frame data from a graphic area of the RAM, and process the image frame data and generate video output signals.

13. A method of launching a virtual machine (VM) at a remote computer system from a computing device, comprising:
- receiving, by a user interface (UI) executed at a processor of the computing device, an input from a user;
- initializing, by the UI, a first virtual desktop client (VDC) locally;
- communicating, by the first VDC executed at the processor of the computing device, with a first VM hosted by a hypervisor of a remote computer system;
- receiving, by the first VDC, desktop video display signals from the first VM;
- sending, by the first VDC, signals associated with the input from the user to the VM hosted by the hypervisor;
- constructing, by a communication module executed at the processor of the computing device, a first web-services message in accordance with a first web services protocol;
- sending, by the communication module, the first web-services message to the hypervisor, wherein the first web-services message instructs the hypervisor to perform a hypervisor management function;
- when the UI fails to communicate with the first VM, instructing, by the UI, the communication module to construct a first web-services message that queries an operating status of the first virtual machine;
- allowing, by the UI, the user to input an identification and a network address of the hypervisor;
- sending, by the communication module, the first web-services message to the hypervisor using the identification and the network address; and
- when the UI receives an indication that the first VM is not running, instructing, by the UI, the communication module to construct a second web-services message that instructs the hypervisor to launch the first VM.

14. The method of claim 13, wherein the computing device is a thin client or zero client;
- wherein the first web-services message is a Simple Object Access Protocol(SOAP) message and the first web services protocol is in accordance with Web Services for Management (WS-MAN) specifications; and
- wherein the input received from the user of the computing device includes at least one of: user name; password; and selection of a virtual machine.

15. The method of claim 13, further comprising:
- allowing, by the UI, a user to input credentials of an administrator of the hypervisor and send the credentials to the communication module, wherein the communication module is configured to verify the credentials with a web services management module of the hypervisor through the first web-services protocol; and
- saving, by the UI, credentials locally on the computing device in an encrypted form.

16. The method of claim 13, wherein the hypervisor comprises a virtual system management server,
- wherein the web services management module is configured to receive the first web-services message from the communication module of the computing device;
- extract an indication of the hypervisor management function; and
- send the indication to the virtual system management server, wherein the virtual system management server is configured to perform the hypervisor management function.

17. The method of claim 13, further comprising:
- initializing, by the UI, a second VDC locally;
- communicating, by the second VDC executed at the processor of the computing device, with a second VM hosted by the hypervisor;
- receiving, by the second VDC, desktop video display signals from the second VM; and
- sending signals associated with the input from the user to the second VM.

18. A non-transitory computer readable medium storing computer executable codes, wherein the codes comprise:
- a user interface (UI) configured to, when executed at a processor of a computing device, receive input from a user of the computing device, wherein the UI is configured to communicate with a first virtual machine (VM) hosted by a hypervisor of a remote computer system, and wherein the UI is configured to initialize a first virtual desktop client (VDC) locally;
- the first VDC configured to, when executed at the processor, communicate with the first VM and receive desktop video display signals from the first VM and send signals associated with input from a user to the VM hosted by the hypervisor; and
- a communication module configured to, when executed at the processor, construct a first web-services message in accordance with a first web services protocol and send the first web-services message to the hypervisor, wherein the first web-services message instructs the hypervisor to perform a hypervisor management function,
- wherein the UI is further configured to:
- when the UI fails to communicate with the first VM, instruct the communication module to construct a first web-services message that queries an operating status of the first virtual machine;
- allow the user to input an identification and a network address of the hypervisor, wherein the communication module is configured to send the first web-services message to the hypervisor using the identification and the network address; and
- when the UI receives an indication that the first VM is not running, instruct the communication module to construct a second web-services message that instructs the hypervisor to launch the first VM.

19. The non-transitory computer readable medium of claim 18, wherein the computing device is a thin client or zero client;
- wherein the first web-services message is a Simple Object Access Protocol(SOAP) message and the first web services protocol is in accordance with Web Services for Management (WS-MAN) specifications;
- wherein the input received from the user of the computing device includes at least one of: user name; password; and selection of a virtual machine.

20. The non-transitory computer readable medium of claim 18, wherein the UI is further configured to
- allow a user to input credentials of an administrator of the hypervisor and send the credentials to the communication module, wherein the communication module is configured to verify the credentials with a web services management module of the hypervisor through the first web-services protocol; and
- save credentials locally on the computing device in an encrypted form.

21. The non-transitory computer readable medium of claim 18, wherein the hypervisor comprises a virtual system management server,
- wherein the web services management module is configured to receive the first web-services message from the communication module of the computing device;
- extract an indication of the hypervisor management function; and
- send the indication to the virtual system management server,
- wherein the virtual system management server is configured to perform the hypervisor management function.

22. The non-transitory computer readable medium of claim 18, wherein the UI is configured to communicate with a second VM hosted by the hypervisor and to initialize a second VDC locally, wherein the second VDC is configured to, when executed at the processor, communicate with the second VM and receive desktop video display signals from the second VM and send signals associated with input from a user to the second VM.

* * * * *